Aug. 5, 1969  E. F. BRADLEY  3,459,303
WASTE TREATMENT SYSTEM
Filed May 9, 1967  4 Sheets-Sheet 1
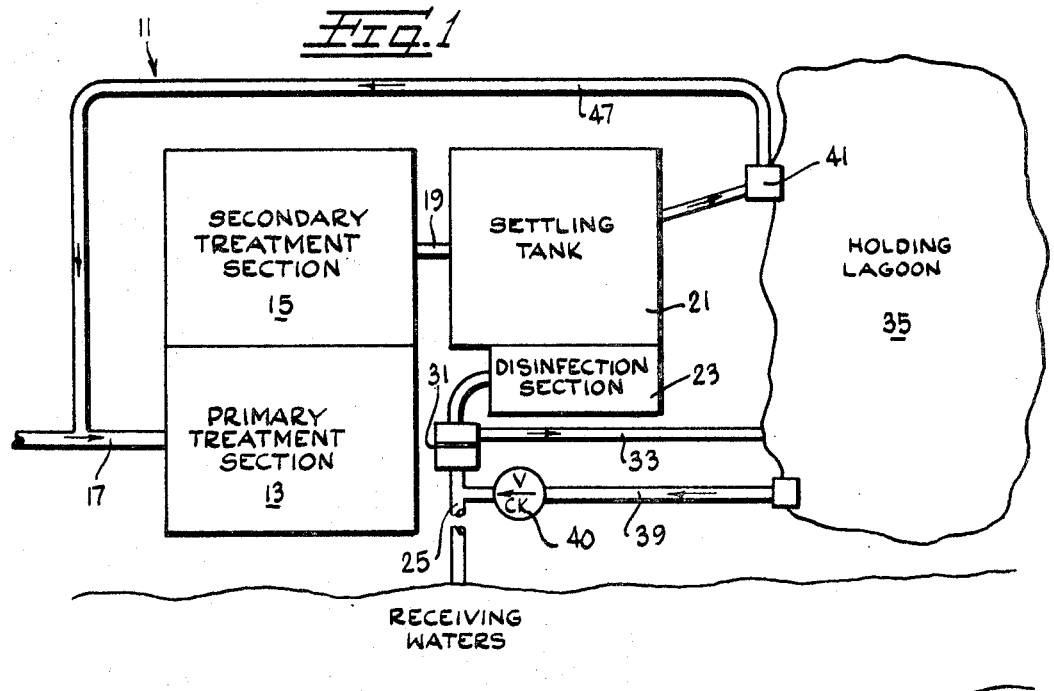
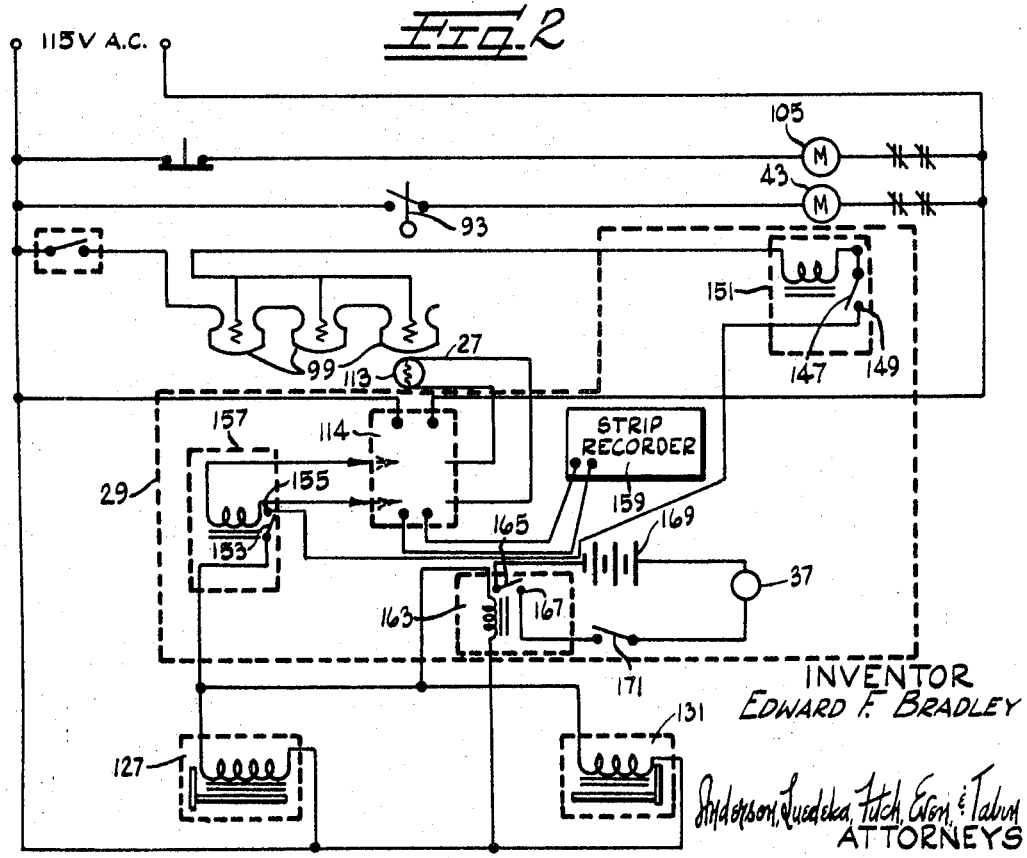
INVENTOR
EDWARD F. BRADLEY
ATTORNEYS

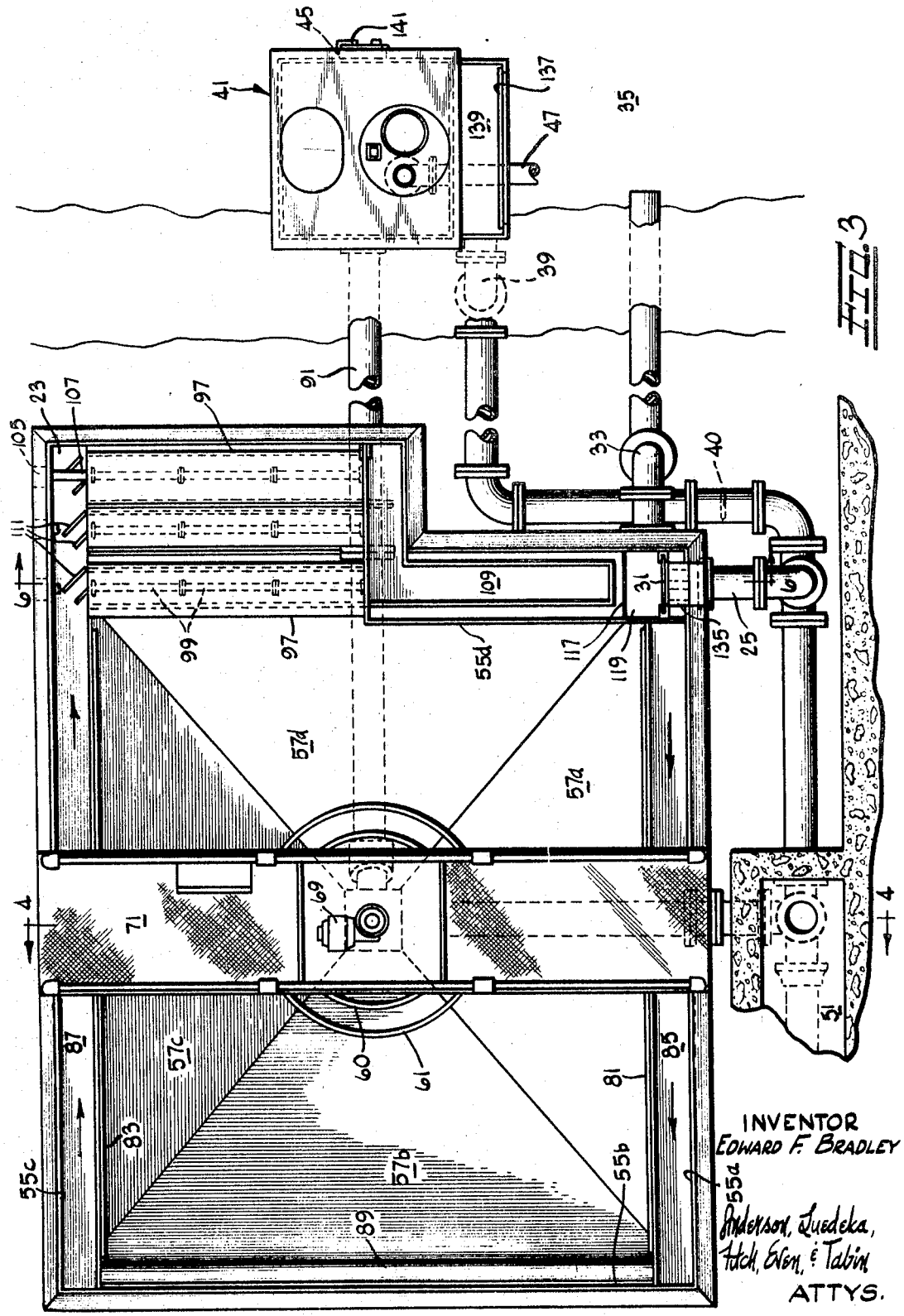

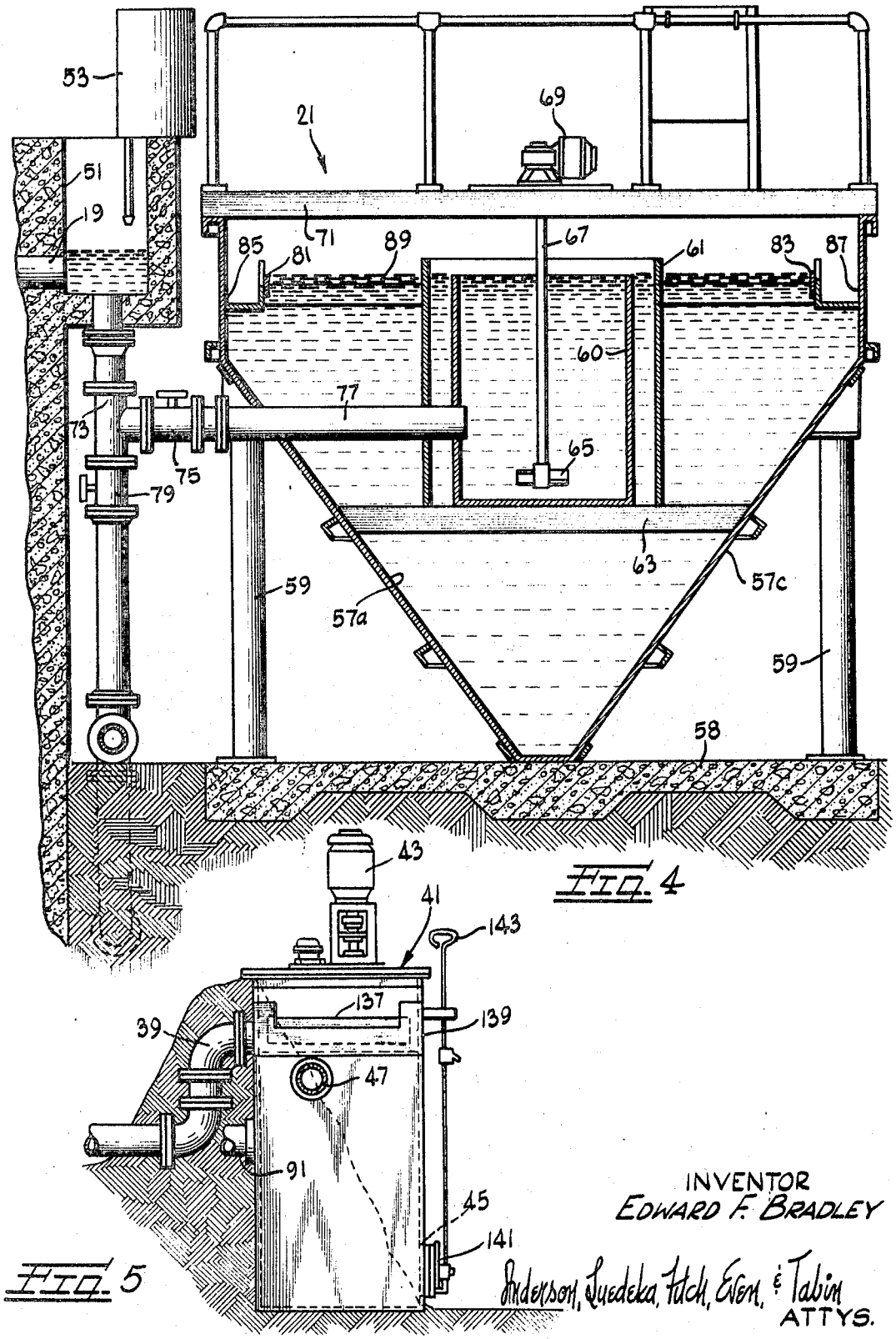

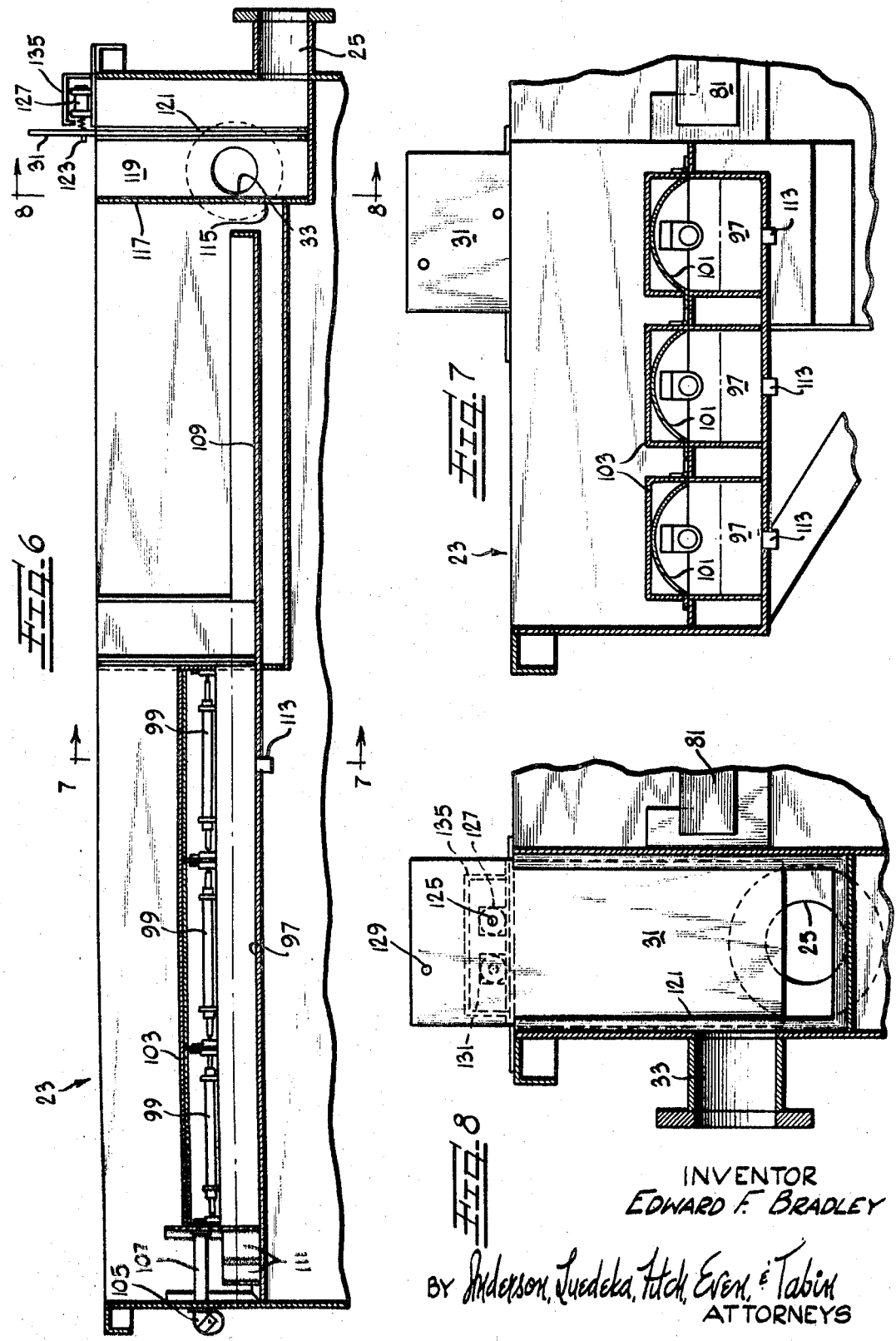

United States Patent Office 3,459,303
Patented Aug. 5, 1969

3,459,303
WASTE TREATMENT SYSTEM
Edward F. Bradley, Hoffman Estates, Ill., assignor to Yeomans Brothers Company, Melrose Park, Ill., a corporation of Delaware
Filed May 9, 1967, Ser. No. 637,303
Int. Cl. B01d 35/12, 35/14
U.S. Cl. 210—85                                16 Claims

ABSTRACT OF THE DISCLOSURE

A waste treatment system wherein the effluent is exposed to disinfection treatment, as by ultraviolet light. The disinfected effluent that is normally discharged to the receiving waters is continuously monitored and a permanent record of the monitoring is made. As soon as the monitoring detects that the effluent does not meet the quality standard set, the effluent is diverted to a holding lagoon and an alarm is actuated by which the attention of a responsible person is attracted. Diversion is also effected upon occurrence of power failure to the plant or upon failure of components thereof. After diversion occurs effluent cannot be arbitrarily discharged to the receiving waters until the monitoring indicates the set level of disinfection is being achieved. The size of the lagoon is sufficient so state health authorities can be notified and proper action taken before the lagoon is filled.

---

This invention relates to waste treatment and more particularly to systems for waste treatment which are designed to produce an effluent that is assured of having a very low pathogen level.

The effluent from waste treatment plants can certainly adversely affect the bodies of water into which it is discharged if the quality of the effluent does not meet minimum standards. As an example, the effluent from waste treatment plants, especially sewage treatment plants, may cause bodies of water to be closed for recreational purposes; likewise, the discharge of effluent into streams, lakes or rivers may render these waters unsuitable as sources of potable water supply for downstream communities. Moreover, waters in coastal communities which yield large supplies of shellfish, e.g., oysters and clams, might necessarily be restricted from harvesting and marketing of the shellfish, thereby resulting in significant economic losses to the respective communities.

To date, a number of waste treatment plants have been constructed in coastal areas wherein the receiving waters have been previously used as shellfish growing waters; and in each instance, the receiving waters in the vicinity of the effluent lines from the waste treatment plant have been necessarily restricted from the harvesting of shellfish. Because of the necessity to maintain adequate health standards, even the effluent from a well-operated plant which discharges 100,000 gallons per day after primary and secondary sewage treatment can be responsible for the restriction of hundreds of acres of surface water and the closing of this acreage from the harvesting of shellfish. Usually, the reason for placing a restriction adjacent to a waste treatment plant in a shellfish growing area is that the effluent from that plant contains a very large number of pathogenic organisms. Shellfish which feed on suspended materials in the water, strain out this material and deposit it within their bodies. Thus, if the material contains pathogens, the shellfish inoculate themselves with these pathogens; and, when harvested, the shellfish may then transmit disease to the consumer as shellfish are quite often eaten raw.

It is an object of the present invention to provide an improved waste treatment system. It is another object to provide a waste treatment system which produces an effluent of assured quality standards so that receiving waters into which this effluent is discharged need not be restricted for use. It is a further object to provide a compact, economically feasible waste treatment plant of the above type containing positive measures for the prevention of inadvertent or accidental discharge of pollution-bearing effluent into receiving waters. It is a still further object to provide a waste treatment system which will even guard against arbitrary discharges of pollution-bearing effluent into receiving waters without adequate prior warning to the state health authorities in charge of the receiving waters. Still another object is to provide a waste treatment system which contains a pathogen-eliminating treatment step and continuously monitoring the effectiveness of this treatment to assure that an effluent is produced which meets the designated water quality standards. These and other objects of the invention will be evident from the following description when read in conjunction with the accompanying drawings wherein:

FIGURE 1 is a diagrammatic view of a waste treatment system embodying various features of the invention;

FIGURE 2 is an electrical schematic view showing the electrical wiring useful in understanding of the operation of the system shown in FIGURE 1;

FIGURE 3 is an enlarged plan view of a preferred embodiment of a portion of a plant employing the system shown in FIGURE 1, with some parts broken away for ease of illustration;

FIGURE 4 is a vertical sectional view taken generally along line 4—4 of FIGURE 3;

FIGURE 5 is an elevational view of a portion of the apparatus shown in FIGURE 3, with parts broken away;

FIGURE 6 is an enlarged vertical sectional view taken generally along line 6—6 of FIGURE 3;

FIGURE 7 is an enlarged vertical sectional view taken along line 7—7 of FIGURE 6; and FIGURE 8 is an enlarged sectional view taken generally along line 8—8 of FIGURE 6.

A waste treatment plant 11, embodying various features of the system provided by the present invention, is diagrammatically illustrated in FIGURE 1. The waste treatment plant 11 includes a primary treatment section 13, such as a primary clarifier, a sludge digester and the usual associated equipment, and a secondary treatment section 15 such as one utilizing a trickling filter or the activated sludge process. Preferably, the secondary treatment is performed by aeration apparatus utilizing the activated sludge process, such as that illustrated in U.S. Patent No. 3,228,526. An influent line 17 carries the incoming waste to the primary treatment section of the plant, and an effluent line 19 serves as an exit from the secondary treatment section 15.

In the illustrated embodiment, the effluent line 19 enters a settling tank 21 for removal of a major portion of the suspended solids therefrom and consequent reduction in the BOD requirement of the effluent. The effluent from the settling tank 21 enters a disinfection section 23 which employs ultraviolet light to reduce the pathogen level of the effluent by destruction of the pathogens therein. Under normal conditions, the disinfected effluent from the disinfection section 23 flows through a discharge pipe 25 which leads to a receiving location, usually a stream or other body of receiving water.

Monitoring means 27 is provided to continuously monitor the effectiveness of the disinfection. The monitoring means 27 is connected to a central control system 29 which is designed to cause diversion of the flow of effluent from the discharge pipe 25 leading to the receiving waters if the effectiveness of the disinfection device drops below a predetermined level or if failures should occur in other portions of the waste treatment plant, as explained more fully hereinafter. Diversion is accomplished by causing diversion means, such as a gate 31, to block flow through the discharge pipe 25. The effluent which can no longer flow through the discharge pipe 25 builds up until the level of a diversion pipe 33 is reached. The diversion pipe 33 leads to a holding basin or lagoon 35 which is provided with sufficient capacity to hold at least about a predetermined fraction of an average day's waste flow for the plant 11. In the illustrated embodiment, the lagoon 35 is designed to hold the volume of waste which normally passes through the waste treatment plant 11 in an average twenty-four hour period. As soon as diversion occurs, the central control system 29 also causes an alarm 37 to be sounded, which is part of a notification system that is designed to cause a responsible person to be informed whenever diversion occurs.

This responsible person, who will generally be the plant operator, then takes whatever action is necessary to correct the malfunctioning equipment. If the trouble can be corrected within the twenty-four hour period, the person notified immediately proceeds to correct the trouble. When the monitoring equipment 29 again indicates that the effluent flowing therethrough meets the predetermined standards, the central control system 29 permits diversion to be halted, as by manually raising the diversion gate 31. If the responsible person determines that it is unlikely that the malfunction will be corrected within the twenty-four hour period wherein the holding lagoon 35 will become filled, as soon as he makes this determination, the state health authorities are immediately notified so that they can take whatever temporary measures are necessary for the restriction of the use of the receiving waters for the time necessary to make the repairs and for a sufficient period thereafter until it can be determined that the effect has been dissipated of the discharge into the receiving waters of what was probably only partially treated waste.

If the necessary repairs are not made within the twenty-four hour period so that the holding lagoon becomes full, an overflow pipe 39 at the top of the lagoon 35 is connected through a suitable check valve 40 with the pipe leading to the receiving waters and thus permits flow of liquid from the upper surface of the lagoon directly into the receiving waters. A sump or wet pit 41 is provided adjacent the lagoon 35, and a motor driven pump 43 is located to take its suction from the wet pit 41 when a port 45 at the bottom thereof is opened. The liquid from the lagoon which enters the wet pit 41 is pumped back through a return line 47 to the influent line 17 entering the waste treatment plant 11. Usually, the liquid is pumped out of the holding lagoon 35 during periods of relatively low influent flow into the plant.

Referring more specifically to FIGURES 3 and 4 of the drawings, the effluent line 19 from the secondary treatment plant section 15 flows into a chamber 51 which is open at its top. A coagulant, such as a polyelectrolyte, is suitably metered into the effluent in the chamber 51 from a tank 53 located thereabove. An example of a suitable polyelectrolyte is Dow C-31.

The settling tank 21 is generally square at its top having four vertical walls 55a, b, c and d. The lower portion of the settling tank 21 is generally that of an inverted pyramid made of four inwardly-sloping sidewalls 57a, b, c and d. The settling tank 21 is mounted on a concrete pad 58 via four upstanding posts or support columns 59, one at each corner.

The settling tank 21 contains a central cylindrical well 60 which is open at its top and which is surrounded by a concentric tubular baffle 61 which extends upward to a vertical height a short distance above the central well 60. The well 60 and the baffle 61 are supported in the settling tank 21 upon a pair of parallel channels 63 to which they are suitably connected, which channels extend across the tank between sloping walls 57a and 57c. A mixed blade 65 is located centrally in the well 60 at a location near the bottom thereof. The mixer blade 65 is located at the bottom of an elongated vertical shaft 67 which depends from a drive unit 69. The drive unit 69 for the mixer is supported on a bridge 71 which spans the settling tank 21.

The effluent with the coagulant added flows from the open-topped chamber 51 downward into a T section 73 and then horizontally through a gate valve 75 into the settling tank through a horizontal inlet pipe 77. The inlet pipe 77 extends into the fluid into the central well 60. Another gate valve 79 at the lower end of the T section 73 provides a bypass connection with the discharge pipe network leading to the receiving waters, which bypass is not normally employed when the system is operating in the planned manner. The mixer insures that good distribution of the coagulant throughout the effluent in the central well 60 is achieved. The liquid overflows the upper end of the central well 60 into the annular region between the central well and the surrounding tubular baffle 61.

The liquid level in the settling tank 21 is maintained via a pair of vertically adjustable weir plates 81 and 83. The liquid overflowing the weirs 81 and 83 enters gradually sloping troughs 85 and 87, respectively, and flows in the direction of the arrows shown in FIGURE 3. The parallel troughs 85 and 87 are interconnected at one end by a pipe 89. The adjustable weirs are maintained at a vertical level below that of the tubular baffle 61 so that a downward flow pattern is created in the annular region between the well 60 and tubular baffle 61. This flow pattern gives a downward direction of movement to the suspended solids in the effluent which assists the settling of the coagulating solids. A sludge drain line 91 (see FIG. 3) provides a path for the settled solids from the very bottom of the settling tank 21 to the wet pit 41. A float valve 93 (shown schematically in FIG. 2) in the wet pit is used to automatically actuate the pump motor 43 and pump the settled solids through the return line 47 to the influent line 17 entering the waste treatment plant 11.

The disinfection section 23 is located adjacent the wall 55d of the settling tank. Various methods of disinfection may be employed which are effective in the destruction of pathogens. The term "pathogens" is employed to include pathogenic bacteria and other organisms, including certain virsuses, which are considered instrumental in causing or furthering diseases. Secondary waste treatment using the activated slude process is believed to be somewhat effective in destroying pathogens because the retention time in the mixed liquor in the aeration tank provides an environment which is detrimental to pathogens. By maintaining the sludge in contact with the liquid for an extended period of time, the destruction of pathogens is accordingly enhanced. This extended treatment is achieved by using the illustrated combination of aeration secondary treatment using the activated sludge process plus removal of suspended solids in the settling tank 21. Various disinfection methods for the conuteraction of pathogens include certain treatments with chlorine, treatment with ozone, treatment with radiation and treatment with ultraviolet light. Treatment with ultraviolet light is preferred, especially when coupled with extended treatment by the activated sludge aeration process as illustrated and described above.

As illustrated in FIGURES 3, 6 and 7, the disinfection section 23 includes three parallel disinfection channels 97 each of which is equipped with separate ultraviolet light sources. As best seen in FIGURE 6, each channel 97 is surmounted by three aligned elongated ultraviolet lamps 99 supported in suitable brackets. As best seen in FIGURE 7, a suitable polished reflector 101 is disposed atop each lamp. A hinged cover 103 overlies each reflector 101. To provide adequate cooling for the ultraviolet lamps, a small blower 105 is connected to each channel 97 via a tube 107 to assure that circulation of air is maintained in each channel in the vicinity of the ultraviolet lamps 99. The water level in the disinfection section 23 is maintained vertically below the location of the ultraviolet lamps 99 via the use of an appropriately dimensioned overflow weir 109 which extends generally as a peninsula that is parallel to the side 55d of the settling tank and generally in alignment with the disinfection channel 97 most proximate to the settling tank.

As best seen in FIGURE 3, the flow from the trough 87 is directed into the three parallel disinfection channels 97 via pairs of baffles 111 which are associated with each channel. The water level in the disinfection section 23 is lower than the water level maintained by the adjustable weirs 81 and 83 in the settling tank so that the flow through the disinfection channels 97 is gravitational.

The monitoring means 27 includes a photoelectric sensing device 113, shown diagrammatically in FIGS. 6 and 7, located at the bottom of each channel 97 in a position generally below the last lamp 99 in line. The photoelectric sensing device 113 in each channel continuously reads the level of intensity of ultraviolet light which pentrates the flowing liquid stream and reaches the bottom of the disinfection channel. The output signals of the photoelectric sensing devices 113 are primarily dependant upon the turbidity of the effluent inasmuch as intensity of the ultraviolet light is decreased by the opacity of the fluid through which it must penetrate. As more particularly explained hereinafter, the output signal of each photoelectric sensing device 113 is fed into an analyzer 114 which determines whether or not sufficient ultraviolet disinfection is being performed to insure that the pathogen level of the effluent is below the desired limits, as explained more fully hereinafter.

The disinfected effluent overflowing the peninsular weir 109 flows through an outlet port 115 (FIG. 6) in a vertical wall 117 at the end of the disinfectant section 23 and into a diversion chamber 119 which is open at its top. The diversion gate 31 is located in a U-shaped guideway 121 in the chamber 119 and is maintained in the raised position (as shown in FIGS. 6 and 8) under normal operating conditions when all the sections of the waste treatment plant 11 are operating properly. With the gate 31 in the raised position, the effluent entering the chamber 119 flows under the gate 31 and directly through the chamber into the discharge pipe 25 which leads to the receiving waters.

As best seen in FIGURES 6 and 8, the diversion gate 31 is maintained in the raised position as a result of the residence of a spring-biased plunger 123 in a hole 125 through the gate. The plunger is spring-biased to an inward or retracted position and remains in the outward position in engagement with the diversion gate 31 only so long as an associated solenoid 127 is energized. As soon as the solenoid 127 is inactivated, the plunger 123 is withdrawn from engagement with the gate 31, and gravity causes the gate to fall to the bottom of the diversion chamber in its guideway 121. As seen in FIGURE 8, the diversion gate 31 is provided with a second hole 129 and another plunger-carrying solenoid 131. The solenoids 127 are mounted in a wetproof enclosure 135 at the top of the rear end of the disinfection section. When the diversion gate 31 falls to its lower position, the hole 129 is in registration with the plunger of the solenoid 131. The plunger of the solenoid 131 is biased to the outward position and is maintained in the retracted or inward position only so long as the solenoid is energized. The solenoids 127 and 131 are wired in electrical parallel connection. Accordingly, when the gate 31 reaches the bottom of the guidway 121, the plunger of the solenoid 131 enters the hole 129, thereby preventing the gate 31 from being raised until the solenoid 131 is again energized. Actual raising of the gate 31 is done manually. This interlock arrangement serves as a positive measure to prevent the plant operator or someone else from arbitrarily deciding to allow partially-treated waste to be discharged into the receiving waters before the holding lagoon 35 is full.

When the gate 31 reaches the bottom of its guideway 121, the rear half of the diversion chamber 119 is sealed off from the effluent. As soon as the front half of the chamber 119 is filled to the level of the diversion pipe 33, effluent begins to flow through the diversion pipe into the holding lagoon 35. As previously indicated, flow continues in this manner until the central control system 29 acknowledges that the desired level of disinfection is again being carried out and again applies power to energize both the solenoids 127 and 131 and permits the diversion gate to be manually raised.

When the diversion gate reaches the raised position shown in FIGURE 8, the hole 125 in the gate is in registration with the plunger 123 of the solenoid 127 so that the plunger snaps into place, locking the gate 31 in raised position so long as the solenoid remains energized.

After a malfunction has occurred which causes diversion to the holding lagoon 35, the lagoon continues to fill up until it reaches the level of an adjustable weir 137 of an overflow box 139 supported adjacent a sidewall of the wet pit 41, see FIGURES 3 and 5. The liquid entering the overflow box 139 flows into the overflow pipe 39 which, as shown in FIGURE 3, connects to the discharge pipe network leading to the receiving waters. After normal operation of the waste treatment plant 11 has been resumed and it is desired to pump out the holding lagoon 35, a shear gate 141 is raised, via a manual handle 143, to thereby open the port 45 at the bottom of the wet pit 41. The wet pit 41 is immediately filled with liquid thereby actuating the float valve control 93 for the pump motor 43 and causing the pumping of liquid out the return line 47 which leads back to the influent line 17 to the waste treatment plant 11.

The precise operation of the central control system 29 can be best understood from FIGURE 2, wherein the electrical wiring is shown schematically. Under normal operating conditions wherein everything is functioning in the planned manner and the required amount of disinfection is being carried out, the solenoids 127 and 131, which are associated with the diversion gate, are energized and thereby lock the gate 31 in a raised position. These two solenoids obtain their power through contacts 147 and 149 of relay 151 and through contacts 153 and 155 of relay 157. The two sets of contacts of these two relays are in electrical series connection. The relay 151 is sometimes termed a current limiting relay. The coil portion of the relay 151 is wired in electrical series connection with three ultraviolet lamps 99 from one of the channels 97, the lamps 99 themselves being wired in electrical parallel connection with one another. The relay 151 is constructed so that the contacts 147 and 149 are normally closed when amperage above a designated value is flowing therethrough. The value is chosen so that the contacts 147 and 149 will remain closed when all three of the ultraviolet lamps 99 are drawing current but so that the contacts will open if one of the lamps burns out and only two lamps continue to operate and draw current. As soon as the contacts 147 and 149 open, power to the solenoids 127 and 131 is removed causing the gate 31 to fall and diversion to commence. For purposes of simplification, only one set of three ultraviolet lamps 99 is illustrated along with one current limiting relay. However, in the illustrated system, there are three sets of each having three disinfection lamps apiece. Accordingly, either the current limiting relay 151 is chosen to distinguish between whether eight or nine lamps 99 connected in parallel are drawing amperage, or three duplicate relays 151 are employed with the contacts thereof arranged in electrical series connection so that opening of the contacts on any one of the three relays removes power from the solenoids 127 and 131.

As previously indicated, a photosensor 113 is disposed in the bottom of each of the three parallel disinfection channels 97 at a location below the last of the three ultraviolet lamps 99. The signal from the photosensor 113 is fed into an analyzer or intensity meter 114 which is set to keep the relay 157 energized so long as the signal from the photosensor exceeds a certain predetermined minimum value. If the signal from the photosensor drops below this value, the intensity meter 114 immediately de-energizes the relay 157, causing the contacts 153 and 155 to open and thereby de-energize both the solenoids 127 and 131.

The calibration of the intensity meter 114 is carried out by taking a series of samples of the disinfected effluent while recording the turbidity level of the effluent and the rate of flow of the effluent through the disinfection section 23. These samples are tested by making a standard plate count and also by making a coliform bacteria count. It is desired that the number of colonies of bacteria indicated by the standard plate count should be well below that normally found in effluent from a waste plant. For present purposes it is desired that the coliform bacteria MPN (most probable number) be less than 100 coliforms per 100 ml.; however, it should be understood that fairly simple design changes might be made to achieve higher levels of disinfection if desired. It is found that, when ultraviolet light is employed as the disinfectant in combination with extended aeration secondary waste treatment using the activated sludge process, whenever the coliform bacteria count meets the standard indicated, the plate count of colonies of bacteria is also within the desired limits.

In the illustrated system, the maximum expected flow rate of effluent through the disinfection section is calculated. Based upon this calculated, anticipated flow rate and the test data obtained by the sampling, it is determined what intensity of ultraviolet should be sened by the sensors 113 in each of the channels 97 in order to assure that disinfection to the desired limits is achieved. When ultraviolet light is employed, the effectiveness of it is of course dependent upon the turbidity of effluent. Accordingly, the settling tank 21 is designed and operated in a manner so as to provide an effluent having the maximum acceptable turbidity at the calculated anticipated maximum flow rate of effluent. For the illustrated system, the maximum acceptable turbidity is set at 150 Jackson turbidity units; however, it should be understood that this value may vary with system design. Accordingly, if the primary or secondary treatment section or the settling tank 21 is not operating properly and the turbidity is not reduced to a level below this value, the opacity of the effluent passing through the disinfection section 23 will be sufficient to reduce the intensity at the photosensor 113 and cause the signal to the intensity meter to drop below the predetermined minimum permissible value. As soon as the intensity meter 114 receives the low signal from the photosensor 113, the relay 157 is de-energized, causing the contacts 153 and 155 to open, the solenoids 127 and 131 to be de-energized and diversion to occur.

It is possible that a low signal may also be generated during certain peak periods of flow when the usual anticipated maximum flow rate is occasionally exceeded. In the illustrated system, the positive safety feature provided by the central control system 29 guards against discharge of such effluent into the receiving waters which might exceed the established pathogen limits. In order to provide this protection, it is felt that one has the choice of accepting the occasional inconvenience of having diversion occur without malfunction of any of the operating equipment or the alternative of increasing the plant capital cost to provide a sufficient increase in plant capacity and/or the disinfection capacity to accommodate such sporadic peak loads. The former is considered preferable.

Although only one photosensor 113 is shown in FIGURE 2, it should be understood that, in the illustrated system three separate photosensors are employed and that the outputs from these three photosensors are monitored by using a switching device (not shown) to successively and repeatedly couple the intensity meter 114 first to one photosensor, then to the next, and then to the next. Moreover, to provide a permanent record which is of interest to state health authorities, a continuous recording strip recorder 159 is connected to the intensity meter 114 to record the level of intensity being monitored, which is indicative of the level of disinfection being continuously accomplished.

As also shown in FIGURE 2, the alarm 37 is included in a circuit that is wired in parallel with the solenoids 127 and 131 associated with the diversion gate 31. The alarm circuit includes a relay 163 having contacts 165 and 167 which are open so long as the coil in the relay is energized. When the solenoids 127 and 131 are de-energized, the coil in the relay 163 is likewise de-energized, causing the contacts 165 and 167 to close and complete a circuit linking the alarm 37 and a battery 169. Any suitable type of alarm may be employed so long as provision is made that notification of a responsible person follows very shortly after actuation of the alarm. In the case of a waste treatment plant that is unattended during a portion of the day, it is contemplated that a telephone line would be employed in order to cause the alarm to be transmitted to some constantly manned facility, such as a local police station, where the persons in attendance will immediately take the steps to notify the responsible person who will either rectify the malfunction or notify the proper state health authorities, as indicated hereinbefore. The central control system 29 is provided with a suitable cutout switch 171 for turning off the alarm 37 after the responsible person has arrived on the scene.

The system not only provides for diversion of the effluent from the receiving waters into the holding basin 35 upon malfunction of the disinfection section or upon malfunction of one of the earlier steps in the waste treatment process which would provide a turbid effluent but it also provides for automatic diversion should a power loss occurs at the waste treatment plant 11. Inasmuch as the solenoids 127 and 131 must be continuously energized in order to maintain the diversion gate 31 in its raised position, should a power loss occur, the diversion gate will immediately fall and it will be locked in its lowered position until power has been re-established to the plant and the disinfection standard is again being met.

Thus, the invention provides a system whereby the quality of waste being discharged into receiving waters is assured to meet certain required standards so that no health hazard will be presented. Moreover, a permanent record of the quality of the effluent is continuously recorded by the recorder which serves as a confirmation of the absence of any health hazard. As a result, much greater utilization of the receiving waters can be realized since the state health officials should always be appraised of any substantial malfunctioning that might occur at the plant with sufficient time to temporarily restrict the use of the receiving waters if necessary. Furthermore, the system provides a positive method of preventing an operator of the plant from arbitrarily deciding to discharge partially-treatd waste into the receiving waters by locking the diversion gate in its lowered position until the required disinfection level is again being achieved. As a result of the use of this system, a sewage plant can be operated which discharges into a shellfish harvesting bed without the resultant condemnation of the bed to the harvesting of shellfish.

Various changes and modifications as would be obvious to one having the ordinary skill in the art may be made to the system. As one example, filtration instead of precipitation might be employed to remove the suspended solids from the effluent. Various of the features of the invention are set forth in the following claims.

What is claimed is:

1. In a waste-treatment system wherein at least primary treatment of waste is carried-out to provide a continuously flowing effluent, the improvement which comprises disinfection means for reducing the count of pathogens and bacteria in said continuously flowing effluent to a desired low level, diverting means for receiving the discharge from said disinfection means, conduit means connected to said diverting means for ischarging said isinfected effluent to a receiving location, basin means associated with said diverting means of sufficient capacity to hold at least a substantial predetermined proportion of the average daily waste flow of said system, said basin means being located at a lower vertical level than said disinfection means to receive effluent by gravitational flow, means for monitoring the effectiveness of said disinfection means and means connected to said monitoring means and to said diverting means for automatically diverting the continuous discharge leaving said disinfection means by gravitational flow to said basin means instead of to said receiving location whenever said monitoring means fails to indicate that the desired level of disinfection is being achieved.

2. The invention in accordance with claim 1 wherein means for removing suspended solids from said effluent to reduce the level thereof to a predetermined value is provided for treatment of said effluent prior to entry into said disinfection means.

3. The invention in accordance with claim 2 wherein said disinfection means includes ultraviolet light producing means.

4. The invention in accordance with claim 3 wherein said monitoring means is located a spaced distance from said ultraviolet light producing means, and wherein said effluent flows between said ultraviolet light producing means and said monitoring means.

5. The invention in accordance with claim 1 wherein said automatic diversion means includes a gate which is moved into diverting position by gravity and wherein retaining means are provided for locking said gate in said diverting positoin until said monitoring means indicates that the desired level of disinfection is again being obtained.

6. The invention in accordance with claim 1 wherein an alarm is actuated that will assure notification of a responsible person whenever diversion is automatically effected.

7. The invention in accordance with claim 1 wherein outlet conduit means at a level adjacent the top of said basin means is connected to said receiving location so that effluent is gravitationally discharged thereto when said basin becomes full, said outlet conduit means being at a vertical level also lower than said disinfection means.

8. In a waste-treatment system wherein at least primary treatment of waste is carried-out to provide an effluent, the improvement which comprises disinfection means for reducing the count of pathogens and bacteria in said effluent to a desired low level, conduit means connected to said disinfection means for discharging said disinfected effluent to a receiving location, basin means of sufficient capacity to hold at least a predetermined proportion of the average daily waste flow of said system, means for monitoring the effectiveness of said disinfection means, and means connected to said monitoring means and to said conduit means for automatically diverting the effluent leaving said disinfection means to said basin means instead of allowing discharge to said receiving location whenever said monitoring means fails to indicate the desired level of disinfection is being achieved, said automatic diversion means including a gate which moves into diverting position by gravity and also including retaining means for locking said gate in said diverting position until said monitoring means indicates that the desired level of disinfection is again being obtained.

9. The invention in accordance with claim 8 wherein means for removing suspended solids from said effluent to reduce the turbidity level thereof to a predetermined value is provided for treatment of said effluent before exposure to said disinfection means.

10. The invention in accordance with claim 9 wherein said disinfection means includes ultraviolet light producing means and wherein said monitoring means measures the ultraviolet light intensity which penetrates a flowing stream of effluent.

11. The invention in accordance with claim 10 wherein an element is provided for engaging said gate and holding said gate in a position above said diverting position and wherein an electrical solenoid is associated with said element for disengaging said element from said gate when electrical power is removed from said solenoid.

12. In a waste-treatment system wherein there is provided at least a section for primary treatment of waste to provide an effluent, the improvement which comprises disinfection means for reducing the count of pathogens and bacteria in said effluent to a desired low level, means for removing suspended solids from said effluent to reduce the level thereof to a predetermined value prior to its entry into said disinfection means, conduit means connected to said disinfection means for discharging said disinfected effluent to a receiving location, basin means of sufficient capacity to hold at least a predetermined proportion of the average daily waste flow of said system, a sump adjacent said basin means, a pump to take suction from said sump and discharge into an influent line to said primary waste treatment section, means for causing the solids from said suspended-solids-removing means to flow to said sump, means for placing said sump in fluid communication with the bottom of said basin means, means for monitoring the effectiveness of said disinfection means and means connected to said monitoring means and to said conduit means for automatically diverting the effluent leaving said disinfection means to said basin means instead of allowing discharge to said receiving location whenever said monitoring means fails to indicate that the desired level of disinfection is being achieved.

13. The invention in accordance with claim 12 wherein secondary treatment aeration means using the activated sludge process is provided for treating said effluent prior to removal of suspended solids therefrom.

14. The invention in accordance with claim 12 wherein there is provided an alarm, means for automatically actuating said alarm at any time of said automatic diversion, and means for locking said system in diverting operation until said monitoring means indicates the desired level of disinfection is again being achieved.

15. In a waste-treatment system wherein at least primary treatment of waste is carried-out to provide an effluent, the improvement which comprises disinfection means for reducing the count of pathogens and bacteria in said effluent to a desired low level, conduit means connected to said disinfection means for discharging said disinfected effluent to a receiving location, basin means of sufficient capacity to hold at least a predetermined proportion of the average daily waste flow of said system, means for monitoring the effectiveness of said disinfection means, and means connected to said monitoring means and to said conduit means for automatically diverting the effluent leaving said disinfection means to said basing means instead of allowing discharge to said receiving location whenever said monitoring means fails to indicate that the desired level of disinfection is being achieved, said automatic diversion means including a gate which moves into diverting position by gravity and including an element for engaging and holding said gate in a position above said diverting position, said element being associated with an electrical solenoid which causes disengagement between said element and said gate whenever electrical power is removed from said solenoid.

16. The invention in accordance with claim 15 wherein means for removing suspended solids from said effluent to reduce the turbidity level thereof to a predetermined value is provided for treatment of said effluent before exposure to said disinfection means, wherein said disinfection means includes ultraviolet light producing means and wherein said monitoring means measures the ultraviolet light intensity which penetrates a flowing stream of effluent.

References Cited

UNITED STATES PATENTS

| | | | |
|---|---|---|---|
| 1,633,079 | 6/1927 | Engle | 210—64 X |
| 2,204,225 | 6/1940 | Merckel | 210—96 X |
| 2,901,114 | 8/1959 | Smith et al. | 210—256 X |
| 3,253,711 | 5/1966 | Young | 210—83 |

OTHER REFERENCES

"Composition by Spectroscopy," Chemical Engineering, June 1957, page 308.

German printed application, 15,004, March 1956.

REUBEN FRIEDMAN, Primary Examiner

J. L. De CESARE, Assistant Examiner

U.S. Cl. X.R.

210—96, 195, 208, 220